United States Patent Office 3,130,194
Patented Apr. 21, 1964

3,130,194
PHENTHIAZINE DERIVATIVES
Robert Michel Jacob, Ablon-sur-Seine, and Jacques Georges Robert, Gentilly, France, assignors to Societe des Usines Chimiques Rhone-Poulenc, Paris, France, a corporation of France
No Drawing. Filed Apr. 20, 1959, Ser. No. 807,273
Claims priority, application France Apr. 24, 1958
1 Claim. (Cl. 260—243)

This invention relates to new derivatives of phenthiazine, to processes for their preparation, and pharmaceutical compositions containing them.

During especially the past decade, considerable research and experimentation have been conducted in the field of N-substituted phenthiazine derivatives and certain of these compounds have been found to possess valuable therapeutic properties. Some are useful primarily on account of outstanding antihistaminic activity, others because of their unusually powerful effect as potentiators of drugs which act upon the nervous system and of their efficacy as anti-shock agents and yet others, for example, are effective agents for controlling or minimising motion-sickness. It has nevertheless been demonstrated that of the very large number of possible N-substituted phenthiazine compounds that have been proposed or tested by various workers, only comparatively few types have useful application in human or veterinary medicine and that both the nature and the degree of useful effect can radically alter even with apparently small changes in chemical structure.

It is an object of the present invention to provide new phenthiazine derivatives which possess useful pharmacological properties of a nature (hereinafter referred to in detail) and of a degree of activity that could not have been predicted from knowledge of their chemical structure.

The phenthiazine derivatives of the present invention are those which conform to the general formula:

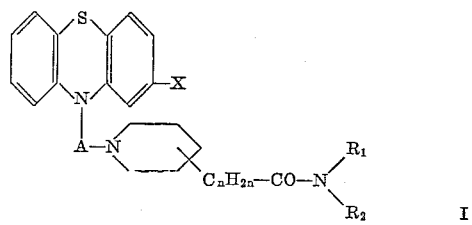

and their acid addition and quaternary ammonium salts, wherein X represents a lower alkyl, alkoxy, acyl, alkylthio, alkanesulphonyl, or di(lower)alkylsulphamoyl group, or a cyano or trifluoromethyl group, A represents a divalent straight or branched aliphatic hydrocarbon group containing 2 to 4 carbon atoms with at least two carbon atoms between the nitrogen atom of the phenthiazine nucleus and that of the piperidine nucleus, $n$ represents 0 or 1, and $R_1$ and $R_2$ are the same or different and each represents a hydrogen atom or a lower alkyl group or $R_1$ and $R_2$ together with the adjacent nitrogen atom collectively represent a saturated mononuclear heterocyclic group such as pyrrolidino, piperidino, morpholino or piperazino. A mononuclear heterocyclic group as aforesaid may be substituted by, for example, a lower alkyl group, or a carbamoyl or sulphamoyl group unsubstituted or substituted on the nitrogen atom to form a grouping

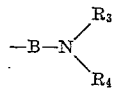

wherein B represents a CO or $SO_2$ group, and $R_3$ represents a hydrogen atom or a lower alkyl group and $R_4$ represents a lower alkyl group or $R_3$ and $R_4$ together with the nitrogen atom to which they are attached form a pyrrolidino, piperidino or morpholino group. The word "lower" as herein applied to alkyl, alkoxy, acyl and alkane radicals means that the group in question contains not more than four carbon atoms.

The hydrocarbon group A may be, for example, any of the following groups:

—(CH$_2$)$_2$—
—CH$_2$—CH(CH$_3$)—
—(CH$_2$)$_3$—
—CH(CH$_3$)—CH$_2$—CH$_2$—
—CH$_2$—CH(CH$_3$)—CH$_2$—
—(CH$_2$)$_4$—

The substituent —C$_n$H$_{2n}$—CO—NR$_1$R$_2$ may be in the 2-, 3-, or 4-position of the piperidine nucleus.

These new phenthiazine compounds may be prepared by the application of known methods for the conversion of phenthiazine and its C-substituted products into the corresponding 10-aminoalkyl-phenthiazines. Such methods when so applied can be defined generically as comprising the interaction of a phenthiazine derivative of the formula:

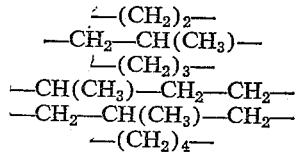

II (wherein X is as hereinbefore defined) with a compound Q, the group P and the compound Q being such that they will interact to produce or form in the 10-position of the phenthiazine nucleus a grouping of the formula:

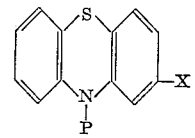

III (wherein A, $n$, $R_1$ and $R_2$ are as hereinbefore defined).

According to a feature of the present invention, the phenthiazine derivatives of general Formula I are prepared by a process which comprises reacting a phenthiazine compound of the general formula:

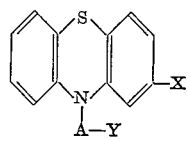

IV with a substituted piperidine of the general formula:

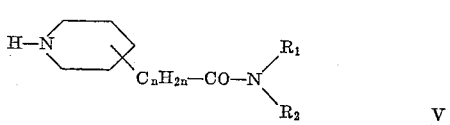

V (wherein Y represents the acid residue of a reactive ester, such as a halogen atom or a sulphuric or sulphonic ester residue, and the other symbols are as hereinbefore defined).

The reaction may be effected by heating the reactants at a temperature between 50° and 150° C., preferably in an inert organic solvent such as an alcohol or an aromatic hydrocarbon (for example, benzene or xylene) optionally in the presence of a condensing agent acting as an acid binding agent, such as an alkali metal carbonate; an excess of the piperidine reactant may equally well be used as the condensing agent.

According to a further feature of the invention, the phenthiazine derivatives of general Formula I are prepared by the process which comprises reacting ammonia or an amine conforming to the formula HNR$_1$R$_2$ (wherein $R_1$ and $R_2$ are as hereinbefore defined) with a piperidinoalkylphenthiazine of the formula:

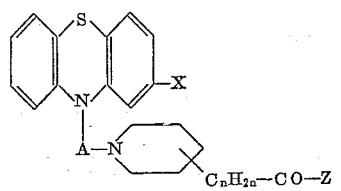

VI (wherein Z represents a halogen atom, such as chlorine or bromine, or an alkoxy group, such as methoxy or ethoxy, and X, A and $n$ are as hereinbefore defined).

The reaction may be effected by heating the reactants at a temperature between 150° and 250° C., preferably in an inert organic solvent such as an alcohol.

According to a still further feature of the invention, the phenthiazine derivatives of Formula I are prepared by the process which comprises reducing by means of molecular hydrogen in the presence of a hydrogenation catalyst a pyridinium salt of the formula:

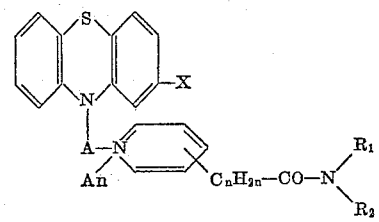

VII (wherein An represents an anion and the other symbols are as hereinbefore defined). Preferably a catalyst containing a noble metal such as platinum, in particular Adams' platinum, is employed. It is advantageous to effect the hydrogenation in an alcoholic or aqueous-alcoholic medium at atmospheric pressure and room temperature.

Of the three specific processes hereinbefore described the first is preferred.

The new phenthiazine derivatives of Formula I may be converted in manner known per se into acid addition salts and quaternary ammonium derivatives. The acid addition salts may be obtained by the action of acids on the phenthiazine derivatives in appropriate solvents. As organic solvent there may be used, for example, alcohols, ethers, ketones or chlorinated hydrocarbons; water may advantageously be used as an inorganic solvent. The salt which is formed is precipitated, if necessary, after concentration of its solution, and is separated by filtration or decantation. The quaternary ammonium derivatives may be obtained by the action of esters on the phenthiazine derivatives, optionally in an organic solvent, at room temperature or, more rapidly, with gentle heating. The new phenthiazine derivatives of Formula I may be purified by physical methods such as distillation, crystallisation or chromatography, or by chemical methods such as the formation of salts, crystallisation of the salts and decomposition of them in an alkaline medium. In the said chemical methods the nature of the anion of the salt is immaterial, the only requirement being that the salt must be well-defined and readily crystallisable.

The new phenthiazine derivatives of the present invention possess valuable pharmacodynamic properties; in particular, they are extremely active depressors of the nervous system, excellent potentiators of narcosis, tranquilizers, powerful antiemetics and very good analgesics. Compounds of the present invention which possess outstanding utility in the aforesaid respects are those in which the hydrocarbon chain A is

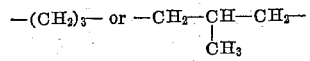

and the substituent $-C_nH_{2n}-CO-NR_1R_2$ on the piperidine nucleus is in the 4-position thereof. Compounds of outstanding importance are those in which A is $-(CH_2)_3-$, the substituent $-C_nH_{2n}-CO-NR_1R_2$ on the piperidine nucleus is in the 4-position thereof, $n$ is 0 and $R_1$ and $R_2$ are hydrogen atoms, e.g. 3-methoxy-10-(3-4'-carbamoylpiperidinopropyl)phenthiazine, 3-cyano-10-(3-4'-carbamoylpiperidinopropyl)phenthiazine, 3-methanesulphonyl-10-(3-4' - carbamoylpiperidinopropyl)phenthiazine, and 3-acetyl-10-(3-4'-carbamoylpiperidinopropyl)phenthiazine.

For therapeutic purposes, the bases of general Formula I are preferably employed as such or in the form of non-toxic acid addition salts, i.e. salts containing anions which are relatively innocuous to the animal organism in therapeutic doses of the salts (such as hydrochlorides and other hydrohalides, phosphates, nitrates, sulphates, acetates, propionates, succinates, benzoates, fumarates, maleates, oxalates, tartrates, methanesulphonates, ethanedisulphenates, chlorotheophyllinates, theophyllinacetates, salicylates, phenolphthaleinates, and methylene-bis-β-hydroxynaphthoates) so that the beneficial physiological properties inherent in the bases are not vitiated by side-effects ascribable to the anions. However, they may also be employed in the form of non-toxic quaternary ammonium salts obtained by reaction with organic halides (e.g. methyl, ethyl, allyl or benzyl iodide, chloride or bromide) or other reactive esters, e.g. methyl or ethyl sulphate or toluene-p-sulphonate.

The following examples illustrate the invention.

*Example I*

A solution of 3-methoxy-10-(3-4'-ethoxycarbonylpiperidinopropyl)phenthiazine (26 g.) in ethanol (100 cc.) with liquid ammonia (200 cc.) is heated in an autoclave for 7 hours at 200° C. After cooling, the ammonia is evaporated by warming gently and the residue is then concentrated to dryness under a pressure of about 15 mm. Hg.

The residue is dissolved in ethyl acetate (200 cc.) and the solution is extracted with 0.7 N methanesulphonic acid (100 cc.). The aqueous acid phase is filtered over charcoal (1 g.) and made alkaline with 4 N sodium hydroxide solution (20 cc.). The free base is extracted with ethyl acetate, and the solution is dried with anhydrous potassium carbonate and evaporated to dryness under a pressure of about 15 mm. Hg.

The solid residue thus obtained is finally recrystallised from acetonitrile and there is thus obtained 3-methoxy-10-(3-4' - carbamoylpiperidinopropyl)phenthiazine (12.5 g.) as a creamy-white crystalline powder, M.P. 132–134° C.

The initial 3-methoxy-10-(3-4'-ethoxycarbonylpiperidinopropyl)phenthiazine (the acid oxalate of which melts at 130–132° C.) is obtained by heating 3-methoxy-10-(3-chloropropyl)phenthiazine with ethyl isonipecotate in xylene under reflux for 15 hours.

*Example II*

A solution of 3-cyano-10-(3-chloropropyl)phenthiazine (10 g.) and isonipecotamide (4.6 g.) in ethanol (100 cc.) is heated under reflux for 24 hours in the presence of anhydrous sodium carbonate (3.5 g.). Sodium carbonate (1.75 g.) is again added and the mixture is heated for a further 8 hours. After another addition of sodium carbonate (1.75 g.), the solution is given a final heating under reflux for 16 hours.

The solvent is removed under reduced pressure (20 mm. Hg) and the residue is treated with water (50 cc.) and ethyl acetate (150 cc.). After agitation, the organic phase is separated and extracted with N hydrochloric acid (200 cc.). The aqueous phase is made alkaline with 4 N sodium hydroxide (60 cc.) and the free base is extracted with ethyl acetate. The organic solution is dried with sodium sulphate and concentrate to dryness under reduced pressure (20 mm. Hg).

The yellow crystalline residue (10.5 g.) is recrystallised first from benzene and then from ethanol. There is thus obtained 3-cyano-10-(3-4'-carbamoylpiperidinopropyl)phenthiazine (4.3 g.) as a yellow crystalline powder, M.P. 148–150° C.

The 3-cyano-10-(3 - chloropropyl)phenthiazine (M.P. 139–140° C.) is prepared by condensation of 1-chloro-3-bromopropane with 3-cyanophenthiazine in liquid ammonia in the presence of sodamide prepared in situ.

The isonipecotamide (M.P. 150–152° C.) is prepared according to GROB et al., Helv. Chim. Act., 37, 1672 (1954).

*Example III*

Proceeding as in Example II but starting from 3-methanesulphonyl-10-(3-chloropropyl)phenthiazine (10 g.), isonipecotamide (4 g.), ethanol (200 cc.) an anhydrous sodium carbonate (6 g. in all), a crude crystalline base is obtained which, after recrystallisation from ethyl acetate, gives 3-methanesulphonyl-10-(3-4'-carbamoylpiperidinopropyl)phenthiazine (6 g.) as a pale yellow crystalline powder, M.P. 170–171° C.

The 3-methanesulphonyl-10-(3-chloropropyl)phenthiazine (M.P. 132–134° C.) is obtained by condensation of 1-chloro-3-bromopropane with 3-methanesulphonylphenthiazine in liquid ammonia in the presence of sodamide prepared in situ.

*Example IV*

Proceeding as in Example II but commencing with 3-acetyl-10-(3-chloropropyl)phenthiazine (10 g.), isonipecotamide (4.45 g.), ethanol (200 cc.) and anhydrous sodium carbonate (7.4 g. in all), a crude base is obtained which, after recrystallisation twice from ethanol, gives 3-acetyl-10-(3,4'-carbamoylpiperidinopropyl)phenthiazine (4.55 g.) as an orange-yellow crystalline powder, M.P. 176–177° C.

The 3 - acetyl - 10 - (3 - chloropropyl)phenthiazine employed as starting material is a thick orange-yellow oil obtained by condensation of 1-chloro-3-bromopropane with 3-acetylphenthiazine in liquid ammonia in the presence of sodamide prepared in situ; it is used in the crude form.

*Example V*

The procedure of Example II is followed but employing 3-trifluoromethyl-10-(3-chloropropyl)phenthiazine (10.3 g.), nipecotamide (4.22 g.), ethanol (200 cc.) and anhydrous sodium carbonate (6.4 g. in all).

The solvent is removed under reduced pressure (20 mm. Hg) and the residue is treated with water (50 cc.) and ethyl acetate (150 cc.). After agitation, the organic phase is separated, dried over anhydrous potassium carbonate and concentrated to dryness under reduced pressure (20 mm. Hg). After washing the crude crystalline base obtained in boiling ether, there is obtained 3-trifluoromethyl - 10 - (3-3' - carbamoylpiperidinopropyl)-phenthiazine (5.4 g.) as a white crystalline powder, M.P. 129–130° C.

The 3 - trifluoromethyl - 10 - (3 - chloropropyl)phenthiazine (M.P. 74–76° C.) is obtained by condensation of 1-chloro-3-bromopropane with 3-trifluoromethylphenthiazine in liquid ammonia in the presence of sodamide prepared in situ.

The nipecotamide (M.P. 111–112° C.) is prepared according to Fox, J. Org. Chem. 17, 542 (1952).

*Example VI*

Proceeding as in Example II but commencing with 3-methylthio - 10 - (3 - chloropropyl)phenthiazine (9.5 g.), nipecotamide (3.6 g.), ethanol (200 cc.) and anhydrous sodium carbonate (5.3 g. in all), the crude oily base obtained (6.9 g.) is dissolved in a benzene-ethyl acetate mixture (1:1) (100 cc.) and the solution is filtered through a column of chromatographic alumina (100 g.). It is then eluted with the same solvent and, after evaporation of the solvent, there is obtained the purified base (3 g.) which is recrystallised from ethyl acetate to give 3 - methylthio - 10 - (3 - 3' - carbamoylpiperidinopropyl)-phenthiazine in the form of a white crystalline powder, M.P. 120–122° C.

The 3 - methylthio - 10 - (3 - chloropropyl)phenthiazine employed as starting material is obtained in the form of a thick yellow oil by condensation of 1-chloro-3-bromopropane with 3-methylthiophenthiazine in liquid ammonia in the presence of sodamide prepared in situ; it is used in the crude form.

*Example VII*

Proceeding as in Example II but commencing with 3-methoxy-10-(3-chloropropyl)phenthiazine (15.3 g.), 4-(N,N-diethylcarbamoyl)piperidine hydrochloride (11 g.), ethanol (200 cc.) and anhydrous sodium carbonate (21.2 g. in all), the crude oily base obtained is purified through the acid oxalate which is prepared in methanol. The base is reformed from the acid oxalate (a white powder M.P. 214–215° C.) by suspension in water, making alkaline with an excess of sodium hydroxide and extraction with ethyl acetate. The base thus purified is converted into the hydrochloride in acetone by the addition of ethereal hydrogen chloride. There is thus obtained 3-methoxy-10-(3-4' - N,N - diethylcarbamoylpiperidinopropyl)phenthiazine hydrochloride (6.6 g.) as a white crystalline powder, M.P. 150–154° C.

The initial 3-methoxy-10-(3-chloropropyl)phenthiazine (M.P. 79–80° C.) is obtained by condensation of 1-chloro-3-bromopropane with 3-methoxyphenthiazine in liquid ammonia in the presence of sodamide prepared in situ.

The 4-(N,N-diethylcarbamoyl)piperidine (hydrochloride, M.P. 270–272° C.) is obtained by hydrogenation of 4-N,N-diethylcarbamoyl)-pyridine in dioxane in the presence of Raney nickel at 170° C. under a hydrogen pressure of 100 kg./sq.cm.

*Example VIII*

Proceeding as in Example II but commencing with 3-methoxy - 10 - (3 - chloro - 2 - methylpropyl)phenthiazine (16 g.), 4-morpholinocarbonylpiperidine hydrochloride (11.8 g.), ethanol (200 cc.) and anhydrous sodium carbonate (in all 21.2 g.), the crude base obtained is recrystallised successively from acetonitrile and ethanol. There is thus obtained 3-methoxy-10-(3-4'-morpholinocarbonylpiperidino-2-methylpropyl)phenthiazine (5.6 g.) as a white crystalline powder, M.P. 168–172° C.

The 3 - methoxy - 10 - (3 - chloro - 2 - methylpropyl)-phenthiazine employed as starting material is obtained in the form of a thick, pale-yellow oil by condensing 3-methoxyphenthiazine with 1-chloro-2-methyl-3-bromopropane in liquid ammonia in the presence of sodamide prepared in situ; it is used in the crude form.

The 4-morpholinocarbonylpiperidine (hydrochloride, M.P. about 305° C.) is obtained by hydrogenating 4-morpholinocarbonylpyridine in dioxan in the presence of Raney nickel at 170° C. under a hydrogen pressure of 100 kg./sq.cm. The last-mentioned compound (M.P. 75–76° C.) is itself obtained by the action of morpholine on isonicotinyl chloride hydrochloride in chloroform under reflux.

The present invention further includes within its scope pharmaceutical compositions which comprise one or more compounds of general Formula I or their acid addition or quaternary ammonium salts together with a significant amount of a pharmaceutical carrier. The invention includes especially such compositions made up for oral, rectal, or parenteral administration.

Solid compositions for oral administration include compressed tablets, pills, dispersible powders, and granules. In such solid compositions one or more of the active compounds of general Formula I is or are admixed with at least one inert diluent such as calcium carbonate, potato starch, alginic acid, or lactose. The compositions may also comprise, as is normal practice, additional substances other than inert diluents, e.g. lubricating agents, such as magnesium stearate.

Liquid compositions for oral administration include pharmaceutically acceptable emulsions, solutions, suspensions, syrups and elixirs containing inert diluents commonly used in the art, such as water and liquid paraffin. Besides inert diluents such compositions may also comprise adjuvants, such as wetting and suspending agents, and sweetening and flavouring agents.

The compositions according to the invention, for oral administration, also include capsules of absorbable material such as gelatin containing one or more of the active substances of general Formula I with or without the addition of diluents or excipients.

Preparations according to the invention for parenteral administratiton include sterile aqueous or non-aqueous solutions, suspensions, or emulsions. Examples of non-aqueous solvents or suspending media are propylene glycol, polyethylene glycol, vegetable oils such as olive oil, and injectable organic esters such as ethyl oleate. These compositions may also contain adjuvants such as wetting, emulsifying and dispersing agents. They may be sterilised by, for example, filtration through a bacteria-retaining filter, by incorporation in the compositions of sterilising agents, by irradiation, or by heating. They may also be manufactured in the form of sterile solid compositions, which can be dissolved in sterile water or some other sterile injectable medium immediately before use.

The percentage of active ingredient in the compositions of the invention may be varied, it being necessary that it should constitute a proportion such that a suitable dosage for the therapeutic effect desired in the species of animal shall be obtained. Obviously several unit dosage forms may be administered at about the same time. In general, the preparations should normally contain between 0.1 and 10 mg. per kilogram of weight of the animal to be treated. In human medicine, the preparations of the present invention should be administered so as to give, in the case of oral administration, 20 to 600 mg. of active substance per day and, in the case of parenteral administration, 10 to 500 mg. of such substance per day.

The following examples illustrate pharmaceutical compositions according to the invention.

*Example IX*

Tablets (150 mg.) are prepared containing:

| | Mg. |
|---|---|
| 3 - methoxy - 10 - (3 - 4' - carbamoylpiperidinopropyl)phenthiazine | 25.8 |
| Starch | 91.2 |
| Finely powdered silica | 30 |
| Magnesium stearate | 3 |

*Example X*

Tablets (150 mg.) are prepared containing:

| | Mg. |
|---|---|
| 3 - cyano - 10 - (3 - 4' - carbamoylpiperidinopropyl)phenthiazine | 10.6 |
| Starch | 106.4 |
| Powdered silica | 30 |
| Magnesium stearate | 3 |

We claim:

A member of the class consisting of the compound 3-methanesulphonyl - 10 - (3 - 4' - carbamoyl - piperidinopropyl)phenthiazine and its non-toxic acid addition salts.

References Cited in the file of this patent

UNITED STATES PATENTS

| 2,534,237 | Cusic | Dec. 19, 1950 |
|---|---|---|
| 2,650,919 | Cusic | Sept. 1, 1953 |
| 2,860,137 | Cusic et al. | Nov. 11, 1958 |
| 2,887,481 | Sherlock | May 19, 1959 |
| 2,898,336 | Gailliot et al. | Aug. 4, 1959 |
| 2,905,668 | Jacob et al. | Sept. 22, 1959 |
| 2,908,683 | Jacob et al. | Oct. 13, 1959 |
| 2,921,069 | Ullyot | Jan. 12, 1960 |
| 2,928,767 | Gulesich et al. | Mar. 15, 1960 |
| 2,957,870 | Cusic et al. | Oct. 25, 1960 |

FOREIGN PATENTS

| 293/55 | South Africa | 1955 |
|---|---|---|
| 560,750 | Belgium | Dec. 30, 1957 |
| 562,299 | Belgium | Feb. 30, 1958 |
| 800,635 | Great Britain | Aug. 27, 1958 |